US006852656B1

(12) United States Patent
La Greca et al.

(10) Patent No.: US 6,852,656 B1
(45) Date of Patent: Feb. 8, 2005

(54) GLASS FIBER COMPOSITION

(75) Inventors: Marco La Greca, Milan (IT); Roberto Massini, Caravaggio (IT); Jorge Pasalaigua Huguet, Valls Tarragona (ES)

(73) Assignee: Techint Compagnia Tecnica Internazionale S.p.A., Milan (IL)

( * ) Notice: Subject to any disclaimer, the term of this patent is extended or adjusted under 35 U.S.C. 154(b) by 93 days.

(21) Appl. No.: 10/089,586

(22) PCT Filed: Sep. 27, 2000

(86) PCT No.: PCT/IT00/00380

§ 371 (c)(1),
(2), (4) Date: Mar. 29, 2002

(87) PCT Pub. No.: WO01/23316

PCT Pub. Date: Apr. 5, 2001

(30) Foreign Application Priority Data

Sep. 30, 1999 (IT) .................... M199A002040

(51) Int. Cl.⁷ ............... C03C 13/00; C03C 3/091
(52) U.S. Cl. ................. 501/35; 501/36; 501/66; 501/69; 501/70
(58) Field of Search ............. 501/35, 36, 65, 501/66, 68, 69, 70

(56) References Cited

U.S. PATENT DOCUMENTS

| 4,312,952 A | * | 1/1982 | Carbol ..................... 501/36 |
| 5,055,428 A | * | 10/1991 | Porter ..................... 501/35 |
| 5,401,693 A | * | 3/1995 | Bauer et al. ............. 501/38 |
| 5,952,254 A | * | 9/1999 | De Meringo et al. ..... 501/36 |

FOREIGN PATENT DOCUMENTS

FR 2781788 A1 * 2/2000 ........... C03C/3/118

OTHER PUBLICATIONS

English translation of FR 2 781 788, Hans Furtak.*
Derwent Abstract 2000–163312, of FR 2,781,788 A1, Furtak, H.*

* cited by examiner

Primary Examiner—David Sample
Assistant Examiner—Elizabeth A. Bolden
(74) Attorney, Agent, or Firm—Pearne & Gordon LLP

(57) ABSTRACT

The invention relates to a biologically-degradable glass fiber composition having good mechanical properties, good workability and in particular fiber-forming-capabilty features and resistance to humidity. The concentrations expressed in percent by weight for each component being the object of the invention are: $SiO_2$: 61 to 66; $Al_2O_3$: 1.1 to 2.1; (CaO+MgO): higher than 9; ($Na_2O+K_2O$): higher than 18; $B_2O_3$: 4 to 15; $P_2O_5$: 0 to 5; $SO_3$: 0 to 1; $Fe_2O_3$: 0 to 0.5; Others: less than 2.

9 Claims, 1 Drawing Sheet

GLASS FIBER COMPOSITION

The present invention relates to a glass fiber composition. In particular, the present invention relates to a biologically-degradable or bio-soluble glass fiber composition, adapted for production of panels and felts of glass wool. These goods are commonly used in the civil and industrial field in the form of heat insulators and/or sound-proofing materials.

Presently known are many glass fiber compositions showing some biological degradability or bio-solubility (solubility of a glass fiber in contact with a biological liquid). It is in fact to be recognized that the biological degradability in glass fibers was in the past and has been till now the object of many studies because a relation seems to exist between this biological degradability and the cancerogenous properties that the glass fiber may show if it is introduced into or absorbed by a human or animal body.

In particular, it has been recently ascertained that a higher bio-solubility can reduce the cancerogenous effects of the glass fibers increasing the capability of the human or animal body to get rid of the possibly-absorbed fibers.

In addition to bio-solubility, the glass fiber compositions of industrial concern must at all events also have an appropriate behaviour with reference to properties of physical, chemical and mechanical nature, such as for example: mechanical strength, elasticity, resistance to thermal fronts and chemical and atmospheric agents, workability, flexibility, fineness, length/diameter ratio. Also to be taken into account is the economic aspect: it is apparent that too expensive glass fibers cannot be put on the market so as to be competitive.

Therefore, greatly felt is a need for a glass fiber composition having a good biological degradability combined with good features with reference to the above mentioned chemical, physical and mechanical properties. In particular, obtaining an economically convenient glass fiber composition having a good biological degradability and at the same time a good resistance to water and humidity is very complicated because the last-mentioned requirement can be hardly reconciled with fibers having a good tendency to dissolve in biological media.

More generally, that which is complicated is coordinating the economical requirements of an industrial production with bio-solubility and with the strength requirements that a fiber must have in order to be able to fulfill the present uses.

It is therefore an aim of the present invention to provide a glass fiber composition which is sufficiently bio-soluble and has a good resistance if brought into contact with water and/or humidity, a good workability, by use of centrifugal techniques for example, a capability of achieving a good heat/soundproof insulation, a good elasticity and reduced brittleness.

It is a further aim of the present invention to provide a glass fiber composition having reduced production costs.

In an attempt to reach the above-mentioned aims, compositions were proposed in the past in which the $SiO_2$ and $Al_2O_3$ content was greatly reduced while corresponding important increases in CaO, MgO, $Na_2O$, $K_2O$ and $B_2O_3$ content were carried out thereby obtaining fibers that were weakly efficient in terms of structure, production and costs.

Surprisingly, as better specified during the following detailed description, the Applicants have developed a biologically degradable glass fiber composition in which, by virtue of a particular combination of alkaline and non-alkaline oxides, the $SiO_2$ and $Al_2O_3$ content have been greatly reduced, while satisfactory results in terms of bio-solubility have been at the same time achieved.

In particular, it is an object of the present invention to provide a biologically degradable or bio-soluble glass fiber composition characterized in that it comprises the following components the counter-actions of which are i expressed in percent by weight:

| | |
|---|---|
| $SiO_2$: | 61 to 66; |
| $Al_2O_3$: | 1.1 to 2.1; |
| (CaO + MgO): | higher than 9; |
| ($Na_2O$ + $K_2O$): | higher than 18; |
| $B_2O_3$: | 4 to 15; |
| $P_2O_5$: | 0 to 5; |
| $SO_3$: | 0 to 1; |
| $Fe_2O_3$: | 0 to 0.5; |
| Others: | less than 2. |

The particular combination and concentration of organic oxides gives the glass fiber composition being the object of the present invention good mechanical features, workability, resistance to humidity and excellent heat/soundproof insulation features.

Figure 1:
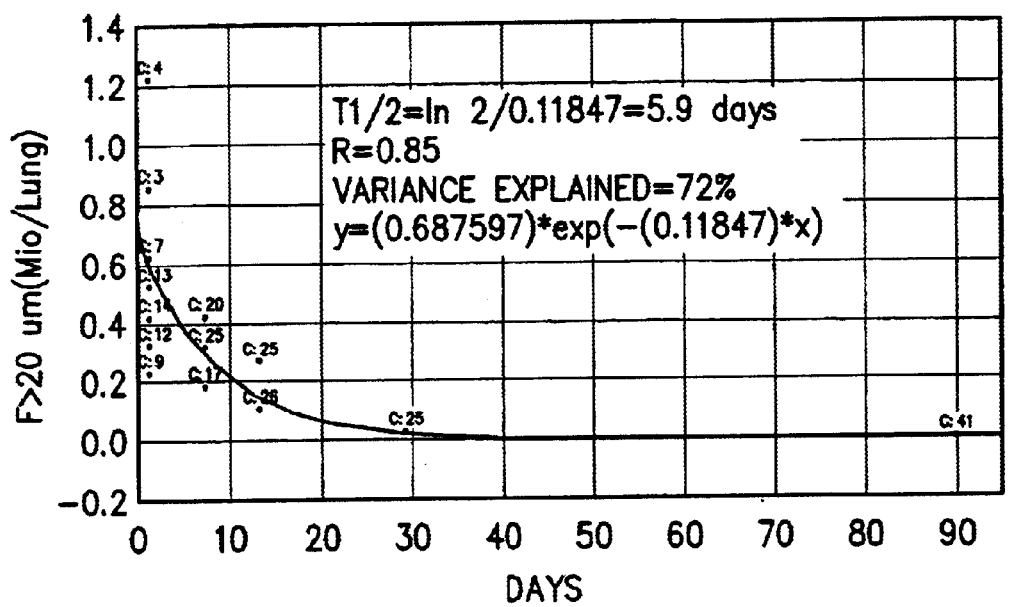
FIG. 1 illustrates the composition of Example 1.
Figure 2:
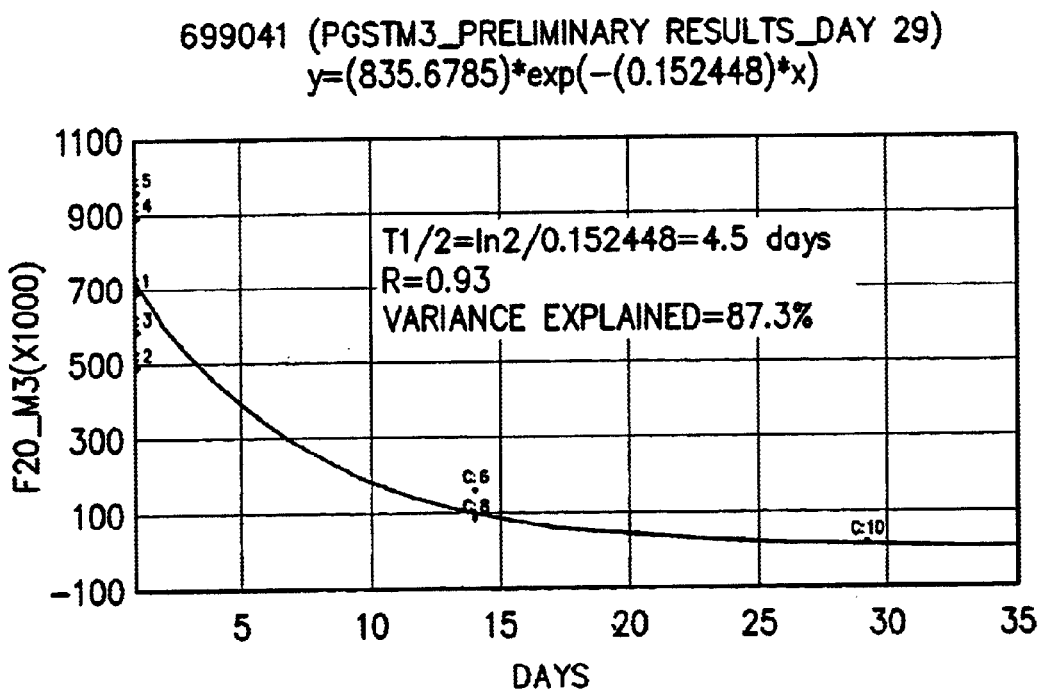
FIG. 2 illustrates the composition of Example 2.

Now, the detailed description of some preferential embodiments of the composition in accordance with the invention will be given and the different components of the glass fiber composition of the invention will be analysed hereinafter; each component will be analysed in order to highlight its behaviour and technical effect in coordination with the other elements in the composition.

Silica ($SiO_2$) is one of the vitrifying agents present in the composition and helps in forming the glass lattice. Silica gives structural properties to glass. In the concerned composition silica is present in a percent by weight included between 61 and 66.

Alumina ($Al_2O_3$) was measured very carefully because a too great percentage by weight would act, among other things, in a manner involving decrease in the biological degradability of the resulting glass. At the same time alumina cannot be completely eliminated because a too water-soluble glass would be obtained. A glass without alumina, once reduced to fiber, would not stand too long in contact with humidity. In addition glass, in order to be able to be formed into fibers, must keep its viscosity value within a well-precise range under which it is practically impossible to obtain fibers in an industrial manner. For the above reasons alumina is present in a concentration by weight included between 1.1 and 2.1. Preferably, alumina is present in a concentration by weight included between 1.1 and 1.8.

Calcium oxide (CaO) and magnesium oxide (MgO) stabilize the glass lattice and give the glass structural features. In addition, calcium oxide and magnesium oxide both reduce the glass viscosity and capability of being formed into fibers. More specifically, it should be pointed out that calcium oxide and magnesium oxide contribute to viscosity in a manner different from each other: magnesium oxide reduces viscosity less than calcium oxide. Calcium oxide and magnesium oxide also affect the biological degradability of the glass fibers.

In accordance with the invention, use of the combination of the two oxides (CaO+MgO) in a percent by weight higher than 9 appeared to be advantageous. In particular a MgO content higher than or equal to 2.5 percent by weight appeared to be useful, the calcium oxide oscillations being included in a range between 6.5 and 8 percent by weight.

Sodium oxide ($Na_2O$) and potassium oxide ($K_2O$) affect the glass degradability making it higher. At the same time, sodium oxide and potassium oxide also increase the water-solubility of glass. In both cases, the potassium oxide contribution is lower than the sodium oxide contribution. The two alkaline oxides also act on the glass viscosity and therefore the glass capability of being formed into fibers. As already mentioned, viscosity is a parameter of the greatest importance as regards glass workability and formation into fibers. In addition, the two alkaline oxides also somewhat affect the glass brittleness. A compromise between economical factors, industrial workability, brittleness, biological degradability and resistance to water was obtained by combining the two alkaline oxides ($Na_2O+K_2O$) in a percentage by weight higher than 18. Preferably and originally, the combination of the two alkaline oxides ($Na_2O+K_2O$) in percent by weight is higher than or equal to 18.50 and lower than or equal to 23. In particular, $Na_2O$ is present in a concentration by weight included between 17.70 and 18.50. In turn, potassium oxide is present in a concentration by weight included between zero and 2 and more preferably it is present in a concentration by weight included between 0.50 and 1.50. It should be noted that an increase in the concentration by weight of $Al_2O_3$ follows an increase in the concentration by weight of $Na_2O$ because the glass viscosity, notwithstanding the possible presence of $K_2O$, becomes too low and therefore an industrially unworkable glass would result.

Boron oxide ($B_2O_3$) advantageously contributes to the glass fiber elasticity. In particular, a felt of fibers having a good elasticity must be able to be compressed and, once released, to take its original thickness again. Elasticity also helps in ensuring a good workability to the glass, above all during the operations for forming it into fibers. An elastic glass fiber surely is subject to less fractures. Since the alumina content was lowered under 2% by weight and at the same time the $Na_2O$ and $K_2O$ content was increased in order to ensure a good bio-solubility, a weight amount of $B_2O_3$ at least included between 4 and 15 and preferably between 5 and 15 was originally inserted in order to avoid too brittle a fiber being obtained. At all events boron oxide $B_2O_3$ also helps in reducing viscosity and has some repercussions from an economical point of view. In addition, boron oxide affects the biological degradability of glass fibers. For the reasons briefly discussed above, when an increase in brittleness occurs, due to an increase in the alkali ($Na_2O+K_2O$) amount for example, the boron oxide component is increased in the composition but only to such an extent that the manufacturing cost of the glass is not increased too much. For instance (see the above-reproduced Example 1), if sodium oxide is present in a high concentration by weight and aluminium oxide is present in a low concentration, the resulting fiber could be more brittle. In order to compensate for the resulting fiber brittleness, preferably a higher concentration by weight of boron oxide is employed.

Phosphoric anhydride ($P_2O_5$) is a vitrifying agent and helps in forming the glass lattice. The phosphoric oxide increases the biological degradability and solubility of glass. It increases the biological degradability and solubility of glass to a greater extent than boron oxide.

The phosphoric oxide is present in a percentage by weight included between zero and 5.

In some cases use of boron oxide in combination with phosphoric oxide $P_2O_5$ so that the $B_2O_3+P_2O_5$ concentration by weight would be greater than 5 appeared to be very advantageous. This combination aims at integrating possible losses in the structural and biological-degradability features. In accordance with the invention, should phosphoric oxide be present in a concentration by weight included between zero and less than 0.1, boron oxide is present in a weight amount greater than 5, preferably in a weight amount greater than 5.5. Should phosphoric oxide be present in a concentration by weight included between 0.75 and 1.5, boron oxide is present in an amount by weight lower than 5, preferably lower than 4.5.

It should be also noted that $P_2O_5$ can be dangerous for furnaces intended for glass melting so that advisably a percentage by weight of $P_2O_5$ higher than 1 should never be exceeded.

Sulfur trioxide ($SO_3$) proved to affect the composition behaviour by improving the biological degradability of glass without substantially varying its resistance to $H_2O$. Sulfur trioxide was therefore provided in a percentage by weight included between zero and 1. Preferably sulfur trioxide is present in a percentage by weight included between 0.10 and 0.5.

Ferric oxide ($Fe_2O_3$) acts on the biological degradability of glass fibers by decreasing it. Therefore it is useful for the ferric oxide to be present in a percentage by weight included between zero and a value not exceeding 0.5. Preferably, the ferric oxide is present in a percentage by weight included between 0.050 and 0.20.

Finally, in the components referred to as "others" it is provided to be included all impurities present in the starting materials and not of particular importance for the composition of the invention, from a technical point of view.

Within the general idea of the embodiment being the object of claim 1, particularly advantageous are the component ranges referred to in claim 5 surprisingly ensuring an excellent compromise between bio-solubility, structural features, workability and costs. In addition, advantageously, even if bio-solubility was facilitated and improved due to relatively high concentrations by weight of the alkaline oxides, the fiber brittleness effects caused by the latter are mitigated through an increase in $B_2O_3$ to such an extent that the fiber-forming features and production costs are not impaired.

More specifically, in accordance with the concrete form disclosed in claim 6 a good biological degradability was obtained and an increase in the combination ($B_2O_3+P_2O_5$) was conceived in order to compensate for a reduction in the amount by weight of $Al_2O_3$ and for an increase in the alkaline oxides that have reduced the structural resistance and increased the glass brittleness, respectively. In particular, the $P_2O_5$ action consists in efficiently increasing the structural features and bio-solubility and the $B_2O_3$ component acts on the fiber elasticity, improves bio-solubility and does not reduce the capability of the glass to be formed into fibers too much.

Still more specifically, in accordance with the concrete form disclosed in claim 6, it is also simultaneously solved the problem of protecting the apparatuses intended for producing the fiber because the relatively high concentrations of $P_2O_5$ involved (>0.1 per cent by weight) increase the biological degradability but are dangerous, since $P_2O_5$ is an acid-hydrolysis hygroscopic oxide. In addition, $P_2O_5$ is rather expensive. A preferred embodiment of the composition of claim 6 is set out in claim 7, according to the ranges therein stated.

The composition reproduced in claim 7 represents a valid compromise between reducing the amount by weight of boron oxide in order to reduce the glass fiber costs, and limiting the damages caused to the furnaces due to a relatively high presence of phosphoric oxide.

Finally, a composition having a high concentration by weight of alumina in accordance with claim 9 surprisingly appears to be bio-soluble since magnesium oxide helps in increasing solubility and also ensures a better behaviour than calcium oxide when the fiber-forming operations are carried out. In an original manner, in the composition in accordance with claim 9 with an alumina increase there is not a corresponding variation in the calcium oxide content but an important increase in magnesium oxide and boron oxide content since one improves bio-sensitivity and the fiber-forming operations and the other improves elasticity and bio-solubility.

Some particular embodiments of glass fiber compositions are given hereinafter by way of non-limiting examples.

EXAMPLE NO. 1

A first illustrative glass fiber composition in accordance with the invention has the following components the concentration of which is expressed in percent by weight:

| | |
|---|---|
| $SiO_2$: | 63.95; |
| $Al_2O_3$: | 1.10; |
| CaO: | 7.50; |
| MgO: | 2.50; |
| $Na_2O$: | 17.80; |
| $K_2O$: | 0.70; |
| $B_2O_3$: | 6.00; |
| $SO_3$: | 0.35; |
| $Fe_2O_3$: | 0.10; |
| Others: | less than 2. |

This glass was worked by centrifugal techniques. The water-solubility value was equal to 26 mg/g.

This evaluation of the resistance to water was carried out with the DGG (Deutsch Glassfasern Gesellschaft) method as also set out in the European Patent No. EP 738693A2.

According to this methodology, 10 g of glass, finely ground to 360–400 microns, is put in 100 ml of distilled water to the boiling point for 5 hours with a dropping cooler. After a quick cooling, the obtained solution is filtered, brought to volume and an aliquot is evaporated in a stove to 150° C., until complete dryness. The weight of the dry residue enables the amount of glass dissolved in water to be known. As above indicated, the expression of the results is in mg per gram of tested glass. As can be seen the glass in Example 1 has a water-solubility value which is not much higher than 200 mg/g, and this is a typical value of standard glasses.

The bio-degradability evaluated by bio-persistence tests in conformity with Protocol ECB/TM/26 rev. 7, 1998 gave rise, for fibers longer than $20\mu$, to a weighted mean life of the fiber considerably lower than the 10 days required by the EEC directives 97/69/CE of May 12, 1997.

EXAMPLE NO. 2

A second glass fiber composition in accordance with the invention has the following components the concentrations of which are expressed in percent by weight:

| | |
|---|---|
| $SiO_2$: | 64.95; |
| $Al_2O_3$: | 1.20; |
| CaO: | 7.00; |
| MgO: | 2.50; |
| $Na_2O$: | 17.80; |
| $K_2O$: | 0.70; |
| $B_2O_3$: | 4.40; |
| $P_2O_5$: | 1.00; |
| $SO_3$: | 0.35; |
| $Fe_2O_3$: | 0.10; |
| Others: | less than 2. |

This glass was worked by centrifugal techniques. The value of the resistance to humidity detected by the DGG method is 32 mg/g. The bio-degradability evalutated by bio-persistence tests in conformity with Protocol ECB/TM/26 rev. 7, 1998 gave rise, for fibers longer than $20\mu$, to a weighted mean life of the fiber considerably lower than the 10 days required by the EEC directives 97/69/CE of May 12, 1997.

EXAMPLE NO. 3

A third illustrative glass fiber composition in accordance with the invention has the following components the concentrations of which are expressed in percent by weight:

| | |
|---|---|
| $SiO_2$: | 63.40; |
| $Al_2O_3$: | 1.70; |
| CaO: | 6.80; |
| MgO: | 3.60; |
| $Na_2O$: | 17.60; |
| $K_2O$: | 0.90; |
| $B_2O_3$: | 5.90; |
| $Fe_2O_3$: | 0.10; |
| Others: | less than 2. |

This glass was worked by centrifugal techniques. The value of resistance to humidity detected by the DGG method is 24 mg/g. The bio-degradability evalutated by bio-persistence tests in conformity with Protocol ECB/TM/26 rev. 7, 1998 gave rise, for fibers longer than $20\mu$, to a weighted mean life of the fiber considerably lower than the 10 days required by the EEC directives 97/69/CE of May 12, 1997.

For completion of the above descriptions, with reference to the compositions referred to in Example 1 and Example 2, the summarizing diagrams relating to the fibers of Example 1 and Example 2 showing the bio-persistence features of the mentioned compositions are reproduced hereinafter.

These bio-persistence features were evalutated, as said, by analysing the capability of these fibers to be evacuated from the inside of the pulmonary tissue of mice submitted to appropriate tests in conformity with the provisions of document EU ECB/TM/26 Rev. 7, 1998.

Based on the foregoing, the bio-persistence features of the fibers were determined by calculating the index of T ½ mathematically describing the capability of the glass fibers to be evacuated from the pulmonary tissue of mice submitted to an experimental treatment.

As provided by the directives, the value of T ½ (lung clearance half time) relates to fibers of a length greater than $20\mu$.

What is claimed is:

1. A biologically-degradable or bio-soluble glass fiber composition, characterized in that it comprises the following components expressed in percent by weight:

| | |
|---|---|
| $SiO_2$: | 61 to 66; |
| $Al_2O_3$: | 1.1 to 1.80; |
| $(CaO + MgO)$: | higher than 9; |
| $Na_2O$: | 17.50 to 18.50; |
| $K_2O$: | 0.6 to 1; |
| $B_2O_3$: | 4 to 15; |
| $P_2O_5$: | 0 to 5; |
| $SO_3$: | 0.1 to 0.5; |
| $Fe_2O_3$: | 0 to 0.5; |
| Others: | less than 2. |

2. The composition as claimed in claim 1, wherein it comprises the following components expressed in percent by weight:

| | |
|---|---|
| $SiO_2$: | 63.95; |
| $Al_2O_3$: | 1.10; |
| $CaO$: | 7.50; |
| $MgO$: | 2.50; |
| $Na_2O$: | 17.80; |
| $K_2O$: | 0.70; |
| $B_2O_3$: | 6.00; |
| $SO_3$: | 0.35; |
| $Fe_2O_3$: | 0.10; |
| Others: | less than 2. |

3. The composition as claimed in claim 1, wherein it comprises the following components expressed in percent by weight:

| | |
|---|---|
| $SiO_2$: | 64.95; |
| $Al_2O_3$: | 1.20; |
| $CaO$: | 7.00; |
| $MgO$: | 2.50; |
| $Na_2O$: | 17.80; |
| $K_2O$: | 0.70; |
| $B_2O_3$: | 4.40; |
| $P_2O_5$: | 1.00; |
| $SO_3$: | 0.35; |
| $Fe_2O_3$: | 0.10; |
| Others: | less than 2. |

4. The composition as claimed in claim 1, wherein it comprises the following components expressed in percent by weight:

| | |
|---|---|
| $SiO_2$: | 63.40; |
| $Al_2O_3$: | 1.70; |
| $CaO$: | 6.80; |
| $MgO$: | 3.60; |
| $Na_2O$: | 17.60; |
| $K_2O$: | 0.90; |
| $B_2O_3$: | 5.90; |
| $Fe_2O_3$: | 0.10; |
| $SO_3$: | 0.1 to 0.5; |
| Others: | less than 2. |

5. A biologically-degradable or bio-soluble glass fiber composition, wherein it comprises the following components expressed in percent by weight:

| | |
|---|---|
| $SiO_2$: | 61 to 66; |
| $Al_2O_3$: | 1.1 to 1.25; |
| $(CaO + MgO)$: | higher than 9; |
| $Na_2O$: | 17.50 to 18.50; |
| $K_2O$: | 0.6 to 1; |
| $B_2O_3$: | 4 to 15; |
| $(B_2O_3 + P_2O_5)$: | higher than 5; |
| $SO_3$: | 0.1 to 0.5; |
| $Fe_2O_3$: | 0 to 0.5; |
| Others: | less than 2. |

6. The composition as claimed in claim 5, wherein it comprises the following components expressed in percent by weight:

| | |
|---|---|
| $B_2O_3$: | higher than 5.5; |
| $P_2O_5$: | 0 to less than 0.1. |

7. The composition as claimed in claim 5, wherein it comprises the following components expressed in percent by weight:

| | |
|---|---|
| $B_2O_3$: | less than 5; |
| $P_2O_5$: | 0.75 to 1.5. |

8. The composition as claimed in claim in claim 5, wherein comprises the following component expressed in percent by weight:

—$Fe_2O_3$: 0.05 to 0.2.

9. A biologically-degradable or bio-soluble glass fiber composition, wherein it comprises the following components expressed in percent by weight:

| | |
|---|---|
| $SiO_2$: | 61 to 66; |
| $Al_2O_3$: | 1.6 to 1.8; |
| $CaO$: | 6 to 9; |
| $MgO$: | higher than 3.50; |
| $Na_2O$: | 17.50 to 18.50; |
| $K_2O$: | 0.6 to 1.5; |
| $B_2O_3$: | 5 to 15; |
| $P_2O_5$: | less than 0.1; |
| $SO_3$: | 0.1 to 0.25; |
| $Fe_2O_3$: | higher than zero; |
| Others: | less than 2. |

* * * * *

UNITED STATES PATENT AND TRADEMARK OFFICE
CERTIFICATE OF CORRECTION

PATENT NO. : 6,852,656 B1
DATED : February 8, 2005
INVENTOR(S) : La Greca et al.

It is certified that error appears in the above-identified patent and that said Letters Patent is hereby corrected as shown below:

Title page,
Item [73], Assignee, after "Internazionale S.p.A., Milan" delete "(IL)" and insert therefor -- (IT) --.

Column 8,
Line 41, before "comprises", insert -- it --.

Signed and Sealed this

Twelfth Day of July, 2005

JON W. DUDAS
*Director of the United States Patent and Trademark Office*